Dec. 4, 1962   S. R. ROZAK   3,066,747
TILLING HOE FOR TRACTORS
Filed Sept. 12, 1960
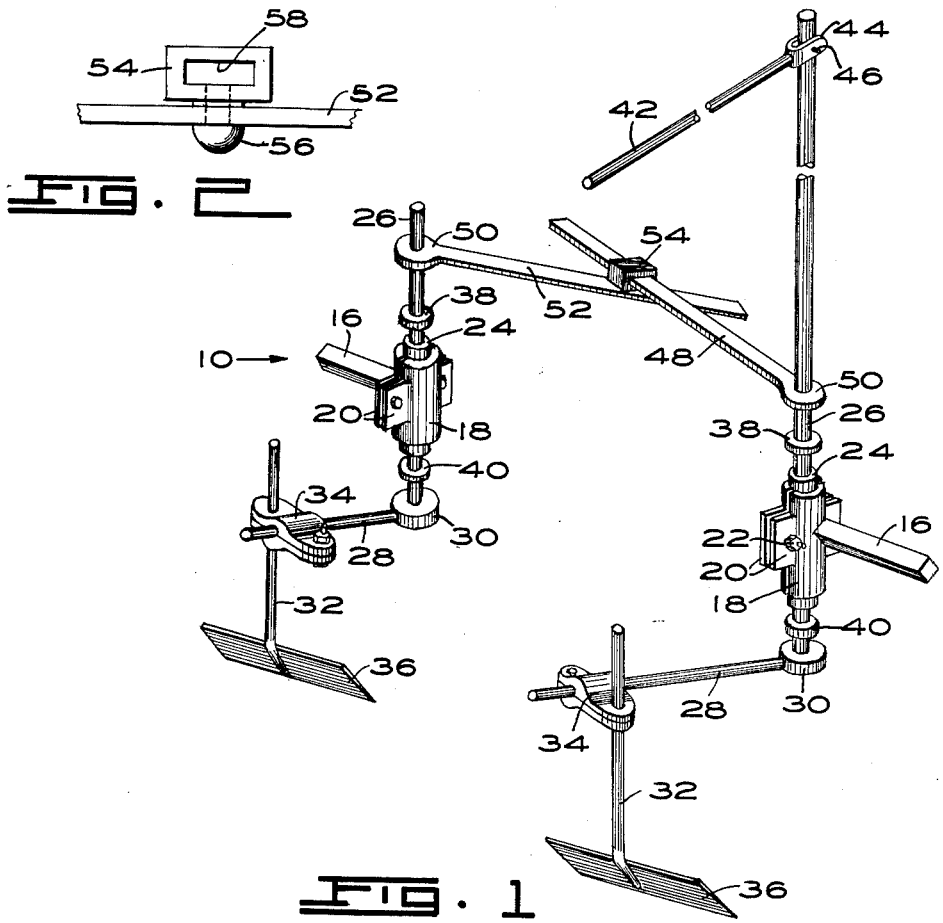
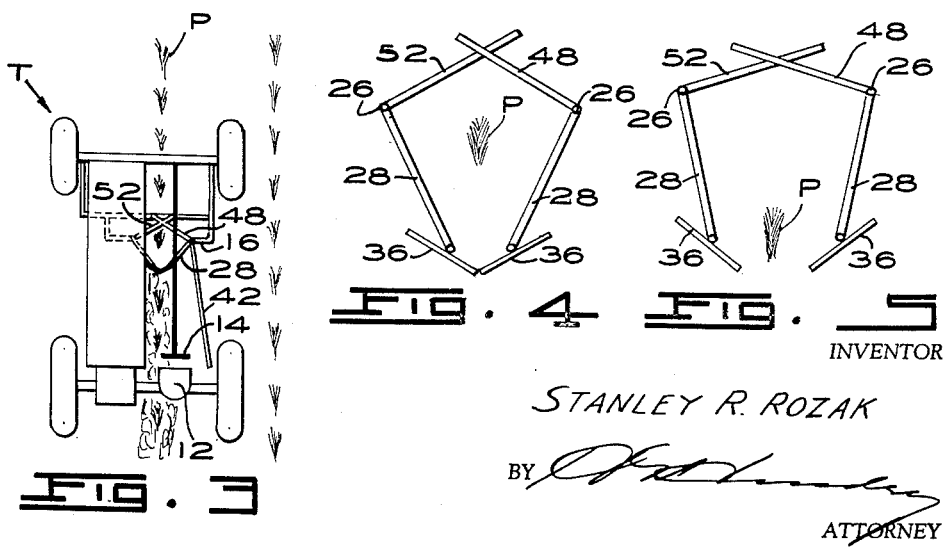
INVENTOR
STANLEY R. ROZAK
BY
ATTORNEY & nbsp;

3,066,747
Patented Dec. 4, 1962

3,066,747
TILLING HOE FOR TRACTORS
Stanley R. Rozak, Burford Township, Brant County, Ontario, Canada. (R.R. 1, Windham Centre, Ontario, Canada)
Filed Sept. 12, 1960, Ser. No. 55,478
2 Claims. (Cl. 172—305)

The present invention generally relates to a cultivating device and more particularly to a tilling hoe for tractors.

The tilling hoe of the present invention is that type which may be moved laterally of the path of movement of the tractor for cultivating or tilling intermediate the individual plant in a row of plants. Heretofore, such tilling devices have been mounted rearwardly of the tactor thus requiring one person to operate the tractor in the desired path and another person to operate the tilling hoe since the operation of the tilling hoe requires considerable attention of the operator so that the individual plants in the row of plants will not be disturbed by the tilling hoes as they proceed longitudinally and oscillate laterally. The present invention has for its primary purpose the provision of a tilling device of the character described above supported from an offset tractor forwardly of the operator's seat and in such a manner that the operator of the tractor may also observe the movement of the tilling hoe thus enabling the operator of the tractor to also operate and control the tilling hoes thereby enabling a single person to both operate the tractor and operate the tilling hoes.

The tilling device of the present invention is mounted on an offset tractor by conventional bracket means and in such a manner that the tilling device may be vertically elevated by the tractor lift mechanism in any suitable manner so that the device may be adapted for use on various types of offset tractors. The tilling device usually employs at least one pair of tilling hoes mounted in such a manner that they may be manually brought together for hoeing intermediate to plants of a row of plants or spread apart to let such plants pass between the hoes or blades.

Another object of the present invention is to provide a tilling hoe for offset tractors which is simple in construction, easy to attach, easy to operate, efficient in operation and generally inexpensive to manufacture.

The foregoing and other objectives, advantages and features of construction will become apparent from a consideration of the following description and the appended drawings.

FIG. 1 is a perspective view of the hoeing or tilling mechanism of the present invention;

FIG. 2 is a detailed view of the swivel mechanism interconnecting the operating arm for the individual hoes;

FIG. 3 is a plan schematic view of an offset tractor and the tilling device mounted thereon illustrating the relationship of the tilling device to the row of plants;

FIG. 4 is a schematic view of the tilling device illustrating the orientation of the blades for tilling intermediate the plants; and FIG. 5 is a schematic view illustrating the blades moved apart so that the plants may pass therebetween.

Referring now specifically to drawings, the numeral 10 generally designates the tilling device or cultivating mechanism of the present invention mounted on a conventional offset type tractor T for use in cultivating plants P in a row and particularly for cultivating intermediate the individual plants of the row as well as alongside of the plants in the usual manner. The tractor T is provided with the usual operator's seat 12 and steering wheel 14. Also, the tractor is provided with a conventional tool bar or supporting mechanism 16 which may be elevated or lowered in any suitable manner either manually or by a power lift mechanism. The details of the support mechanism are conventional and do not form part of the present invention except in ther environmental relationship to the tilling mechanism 10.

FIG. 1 illustrates the support bar or tool bar 16 and its relationship to the cultivating mechanism. This bar is usually of square configuration and is sectional with the ends thereof having a split clamp 18 attached thereto. One side of the split clamp 18 is rigid with the bar 16 and the other side is movable in relation thereto. Each side of the split clamp is provided with laterally extending ears 20 adjustably secured together by fastening bolts 22 or the like. Rigidly secured in the split clamp 18 is a cylindrical sleeve or bushing 24. The sleeve or bushing 24 rotatably and vertically slidably receives a vertical rod 26. The lower end of the vertical rod 26 is provided with a trailing arm 28 rigidly affixed thereto by a collar 30 or the like. The rear end of the arm 28 adjustably supports a depending vertical arm 32 by virtue of an adjustable split clamp assembly 34. The lower end of the arm 32 supports a transversely extending and inclined hoe or blade 36 for cultivating the soil with the blade 36 being orientated as illustrated in FIGS. 4 and 5. The rod or shaft 26 is provided with collars 38 and 40 above and below the sleeve or bushing 24 whereby the support bar 16 may be elevated for elevating the hoeing mechanism and for lowering the hoeing mechanism into contact with the ground surface. The mechanism previously described is duplicated on each of the support bars 16 and thus a pair of hoeing blades 36 are provided with the structure being identical and the same reference numerals being employed. The only difference is in the length of the rod or shaft 26. One of the shafts 26, preferably that in alignment with the operator's seat or nearest in alignment with the operator's seat 12 is verically elongated as illustrated in FIG. 1. Pivotally attached to the elongated shaft is an elongated operating handle 42 having a U-shaped clevis 44 on the free end thereof with the clevis being pivotally attached to the shaft 26 by a pin or bolt 46. Thus, the operating arm 42 may swing in a vertical plane but when the operating arm 42 is swung in a horizontal plane, the rod 26 will be rotated about its longitudinal axis thus causing the blade 36 to swing in a horizontal plane corresponding to the horizontal movement of the operating arm 42.

Interconnecting the shafts or rods 26 is a mechanism for oscillating the rods 26 simultaneously. The mechanism for interconnecting the shafts 26 includes an elongated laterally extending arm 48 attached to the shaft rigidly by virtue of a collar 50 and a suitable locking mechanism such as a set screw or the like. For purposes of description, one of the arms is designated by 48 while the other of the arms is designated by numeral 52 since the arms are related in a peculiar manner. The arm 48 is disposed in overlying relation to the arm 52. The arm 52 is provided with a square or rectangular hollow slide block 54 swivelly attached thereto by virtue of a rivet 56 or an equivalent attaching means. This enables the slide block 54 to pivot about a vertical axis formed by the rivet. The other arm 48 is slidably received in the hollow interior 58 of the slide block 54 whereby swinging movement of the arm 48 will cause swinging movement of the arm 52 in an opposite direction thus oscillating the shafts 26 and the arms 28 in such a manner that the hoeing blades 36 will be moved towards and away from each other. When the hoeing blades are moved toward each other, they will cultivate the area intermediate the plants P. When the cultivating blades 36 are moved away from each other, the area of the soil adjacent the plants P will be cultivated and the plants P may pass between the cultivating blades. The two positions of the blades 36 are schematically illustrated in FIGS. 4 and 5 and this is also true of the position of the arms 28, shafts 26, and arms 48 and 52. Thus, with this construction, the operator of the vehicle sitting on the operator's seat 12 may operate the handle 42 for moving the cultivating blades 36 inwardly and outwardly in relation to each other as required for properly cultivating the plants in the row of plants. Due to the position of the cultivator blades directly in front of the operator's seat 12, the operator of the tractor may also control the tractor in the usual manner and at the same time effectively control operation of the cultivating blades 36 thus requiring only a single operator for the tractor and the cultivating blades rather than two operators previously employed.

While this invention has been described in a specific form and as operating in a specific manner for the purpose of illustration, it is to be understood that the invention is not limited thereto, since various modifications will suggest themselves to those skilled in the art without departing from the spirit of this invention, the scope of which is set forth in the annexed claims.

I claim:

1. The combination with a tractor of the offset type having an operator's seat at the rear, a steering wheel conveniently arranged adjacent to the rear for an operator seated on the seat and an elevatable tool bar mechanism adjacent to the front including a pair of support bars having portions projecting toward each other and terminating in ends in spaced apart relationship at opposite sides of the tractor and movable downwardly and upwardly relative to the ground, of tilling means carried by said tractor for cultivating the soil alongside and between plants spaced apart lengthwise in a row, comprising a pair of vertical rods, means on the end of one said support bar for rotatably and slidably receiving the one said vertical rod whereby the one said vertical rod is movable vertically and rotatably in relation to the one said support bar, means on the end of the second said support bar for rotatably and slidably receiving the second said vertical rod whereby the second said vertical rod is movable vertically and rotatably in relation to the second said support bar, said means comprising split clamps having bushings therein receiving said vertical rods, said rods having spaced collars above and below said bushings to allow for limited vertical movement of said rods, a trailing arm fixedly mounted on each said vertical rod and extending rearwardly therefrom toward the operator's seat on the tractor, a pair of cultivator blades, means for supporting each said blade from each said trailing arm whereby the blades are angularly arranged at opposite sides of the tractor directly in front of the operator's seat and are movable vertically in relation to the ground corresponding to vertical movement of said vertical rods, handle means attached to the first said vertical rod and extending rearwardly to a position adjacent to the operator's seat for rotating the said first vertical rod, and means interconnecting said vertical rods for turning the second said vertical rod in opposite direction to the first said vertical rod for simultaneously swinging the cultivator blades inwardly toward each other and swinging the blades outwardly in relation to each other when the first said vertical rod is rotated by an operator seated on the tractor to thereby cultivate the soil between the plants while the tractor proceeds along the row of plants.

2. The structure as defined in claim 1 wherein said means interconnecting said vertical rods comprises an arm attached rigidly to each of said rods and disposed in intersecting relation, a slide block swivelly connected to one of said interconnecting arms and slidably received in the other of said connecting arms.

References Cited in the file of this patent

UNITED STATES PATENTS

| 782,705 | Simmons et al. | Feb. 14, 1905 |
| 1,354,556 | Holt | Oct. 5, 1920 |
| 2,601,380 | Flory | June 24, 1952 |

FOREIGN PATENTS

| 1,110,439 | France | Oct. 12, 1955 |